Dec. 1, 1959  R. BALDUS ET AL  2,914,846
METHOD OF PRODUCING NONDISTORTABLE LININGS OF
NONCORROSIVE, METALLIC MATERIALS FOR
CONTAINERS OF ANY KIND
Filed Dec. 8, 1954
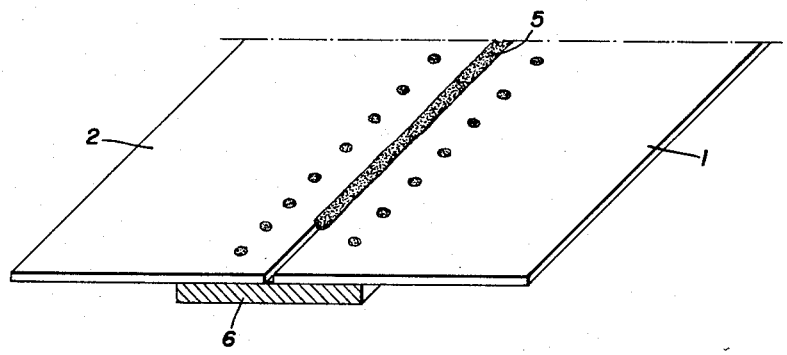
INVENTOR
RUDOLF BALDUS
HERMANN HOLLER
BY
ATTORNEY United States Patent Office 2,914,846
Patented Dec. 1, 1959

2,914,846

METHOD OF PRODUCING NONDISTORTABLE LININGS OF NONCORROSIVE, METALLIC MATERIALS FOR CONTAINERS OF ANY KIND

Rudolf Baldus, Koln-Marienburg, and Hermann Holler, Frankfurt am Main, Germany

Application December 8, 1954, Serial No. 473,929

Claims priority, application Austria December 9, 1953

5 Claims. (Cl. 29—471.1)

The present invention relates to a new and improved method of producing non-distortable linings of noncorrosive, metallic materials for containers of any kind.

It has for a long time been a problem in the chemical and food industry to manufacture durable, noncorrosive, and relatively inexpensive linings for containers of any kind, whether they be of iron, concrete, wood, or any other material. In such containers it has so far been impossible to produce a so-called "foil-lining" of non-corrosive materials with level welding seams since the difficulties of welding the respective non-corrosive foils could not be overcome. When welding the longitudinal and transverse seams of thin metal sheets by fusion, the heat of the prior welding processes caused the ends of the sheets to be connected to become distorted from the level surface to such an extent that proper seams could never be obtained.

An additional difficulty is caused, particularly in containers for the food and beverage industry, by the fact that the welding seams must not only be tight but absolutely smooth as well, since they may otherwise hide dirt and form breeding places for bacteria which, for example, in breweries, may lead to such dangerous infections of the entire brewery which, once set-in, can hardly be overcome and are a constant anxiety in that industry.

It is therefore the object of the present invention to devise a new method of producing welding seams on linings made of such thin, nonselfsupporting, metallic materials in which any distortion of the seams connecting the adjacent sheets caused by the heat of welding will be avoided.

A principal feature of the invention for carrying out such object consists in metallically combining the non-selfsupporting, thin metallic sheets or foils of a thickness, for example, of 0.5 mm. or 0.02 inch, with the walls of the respective container, and in joining the abutting edges tightly and solidly by welding.

Prior to the invention it was known in self-supporting containers to weld straps upon their undersides so as to reinforce the strength of their longitudinal and transverse seams. The present invention, however, proposes either to weld the straps upon the underside or on top of the foils or sheets for the two-fold purpose of solidifying the foil ends and keeping them flat so as to permit them to be welded evenly and, on the other hand, to serve as a framework for supporting the walls of the sheets or foils which are too thin to be selfsupporting.

If, according to the invention, the containers to be lined consist of metal, the thin metal sheets or foils may be connected to the walls thereof by being spot-welded from one side. If, however, the containers consist of non-metallic materials, such as concrete, it will be necessary to provide on the inner walls thereof metallic reinforcing straps or strips, if necessary, even in the form of a supporting framework, upon which the inner lining may then be permanently secured by spot-welding from one side.

Such reinforcing strips are preferably made of the same material as the lining since otherwise when welding the highly noncorrosive metal foils to be used according to the invention, they may alloy themselves with the material of the supporting strips which would affect the mechanical, physical, and chemical qualities of the lining.

Another feature of the invention for obtaining the same effect consists in applying between the metal foil of the lining and the reinforcing strips an intermediate layer of the same composition as the noncorrosive foils, so that any alloying of the two metals will not reach into the foil of the lining proper.

Another feature of the invention consists in providing the reinforcing strips placed underneath the welding seam with holes or grooves so as to effect a favorable heat distribution within the area of the welding seam.

A supplementary feature of the invention consists in additionally connecting the foil lining with the container walls outside of the welds by mechanical means so as to reinforce the supporting framework. For this purpose, bolts may be shot through the material.

Also, before shooting the bolts, the lining may be provided at the particular points with series of holes of twice the diameter of the bolts, and the bolts having internal and external threads may be screwed together with a cap of the same material as the lining which will thus be pressed upon the container wall, but not as strongly as would prevent the lining material from expanding or contracting. Furthermore, the lining material may be pressed and secured by a screw of iron or stainless steel upon the internal or external threads of the bolts, while the iron screw part may be protected from touching the fluid in the container by means of a welded-on cap of synthetic material, or noncorrosive metal, such as stainless steel, and preferably of the same or similar material as the container walls.

When lining metallic containers with metal foils it has also proved very successful in actual practice to fix and mount the foil ends directly on the container wall, for example, by one-sided spot-welding, so that when welding the longitudinal seams, they cannot again shift or warp under the effect of the heat thereof.

The new method is by no means restricted to the linings of containers but it is of particular importance also in all those cases where coverings or linings are to be applied upon a base of different material. It effectively solves the difficult problem long prevalent in many fields of industry of substituting ferrous materials which are plated with a thin noncorrosive layer in the place of solid, non-corrosive materials in all those cases where the use of thick, solid constructions in a resistant material has to be dispensed with in the manufacture of instruments and apparatus for reasons of economy.

The appended drawing is merely illustrative of the new method to exemplify its application where two metal foils are welded together on a support strip.

In the illustrated embodiment of the invention, the adjacent edges of the two metal sheets or foils 1 and 2 are reinforced by a single metal strip 6 which, prior to welding of the seam 5 to connect the edges of the sheets 1 and 2, is likewise secured to the sheets by spot welding.

When lining nonmetallic containers, the reinforcing strips of the seams of noncorrosive metal foils may also act as means for securing the lining to the nonmetallic body by first mounting the strips with any suitable means on the container walls. For providing sufficient support for the foil wall, any suitable number of such reinforcing strips may be secured on the container wall, and the foil may thereafter be attached to such strips by spot-welding.

When coating iron containers with very thin foils, the danger may arise that the foil material may alloy itself with the iron and lose some of its noncorrosive qualities.

In such cases, solid strips of either the same or a similar material as the foils, or steel strips which are plated with such a material are preferably used. When spot-welding the foil, it is also possible simply to slide a piece of material similar to that of the foil between the foil and the reinforcing strip. Thus, an alloying of the welding seam with the material of the reinforcing strips may be safely avoided. In metallic containers the connecting seams of the foils may also be welded after securing the end portions of the foils directly upon the container walls, preferably by spot-welding, if, prior to the seam-welding, layers of the same material as the foils are first placed underneath the points where the welding seam will be located, and the foils, the underlying layer, and the container walls may then be welded together. Obviously, the intermediate layer may also consist of a foil similar to that of the lining.

When lining metallic containers or other bodies with metal foils, it has proved successful to attach or clamp the foil ends, for example, by means of one-sided spot-welding, directly on the container wall so that under the effect of the heat of welding the longitudinal seams, the foil ends cannot pull or warp away but will lie flatly adjacent each other and thus form a smooth and level seam.

When applying the new welding method to the lining of containers the structure may be further solidified by additionally securing the lining to the container walls by shooting the mounting bolts directly through the lining and the reinforcing strips, or by providing them prior to shooting the bolts with holes of a diameter approximately twice that of the bolts. The bolts provided with internal and external threads may then be screwed together with a cap made of the lining material, and the lining material may thus be pressed against the container wall, but not so tightly that the bolts will restrain the lining material from expanding or contracting. The lining material may also be pressed upon and secured to the internal or external threads of the bolts by an iron screw or one of stainless steel, while the iron screw part may be protected from contact with the fluid in the container by a welded-on cap of synthetic material or noncorrosive metal such as stainless steel, and preferably by one made of the same or similar material as the container lining.

Although the new welding method has been described as applied specifically to the lining of containers, it may also be used to cover either the surfaces of any other base consisting of different material from the lining and used in other apparatus or instruments where such base should be protected from corrosion or the substance coming in contact therewith from contamination caused by such corrosion, and where for economic or any other reasons it is desirable that the metal lining or coating be of a very thin material.

While the foregoing description sets forth in detail what we regard as the preferred embodiments of our invention, it is to be understood that numerous changes may be made therein without departing from the spirit and scope of the invention as defined in the appended claims.

Having thus described our invention, what we claim as new is:

1. A method of providing the walls of a structure with a corrosion-resistant lining, comprising the steps of fitting the walls with non-selfsupporting, non-corrosive metallic foils having a thickness of the order of 0.5 mm., abutting edges of the foils forming seams, securing the foils to the walls by spot-welding from one side along the abutting edges and adjacent thereto whereby the abutting edges are held in one plane and against distortion, and then welding the abutting edges together to form welded seams between the foils.

2. A method of providing the walls of a structure with a corrosion-resistant lining, comprising the steps of securing metallic strips to the walls, fitting the walls with non-selfsupporting, non-corrosive metallic foils having a thickness of the order of 0.5 mm., abutting edges of the foils forming seams over said metallic strips, securing the foils to the metallic strips by spot-welding from one side along the abutting edges and adjacent thereto whereby the abutting edges are held in one plane and against distortion, and then welding the abutting edges together to form welded seams between the foils and over the metallic strips.

3. The method of claim 2, wherein the metallic strips are of the same material as the foils.

4. The method of claim 2, wherein the walls are metallic and the metallic strips are of a material preventing alloying of the container wall metal with the non-corrosive foils.

5. A method of providing the walls of a structure with a corrosion-resistant lining, comprising the steps of securing metallic strips to the walls, fitting the walls with non-selfsupporting, non-corrosive metallic foils having a thickness of the order of 0.5 mm., abutting edges of the foils forming seams over said metallic strips, inserting auxiliary strips of a material preventing alloying of the metallic strips with the foils between the metallic strips and the foils, securing the foils to the auxiliary strips and the metallic strips by spot-welding from one side along the abutting edges and adjacent thereto whereby the abutting edges are held in one place and against distortion, and then welding the abutting edges together to form welded seams between the foils.

References Cited in the file of this patent

UNITED STATES PATENTS

| | | |
|---|---|---|
| 1,452,523 | Ostrander | Apr. 23, 1923 |
| 2,024,686 | Farmer | Dec. 17, 1935 |
| 2,039,602 | Luehbe | May 5, 1936 |
| 2,137,909 | Hagedorn | Nov. 22, 1938 |
| 2,172,819 | Howard et al. | Sept. 12, 1939 |
| 2,198,331 | Chyle | Apr. 23, 1940 |
| 2,209,290 | Watts | July 23, 1940 |
| 2,214,002 | Trainer et al. | Sept. 10, 1940 |
| 2,265,943 | Laig | Dec. 9, 1941 |
| 2,280,150 | Hasse et al. | Apr. 21, 1942 |
| 2,300,700 | Porter et al. | Nov. 3, 1942 |
| 2,319,455 | Hardmann et al. | May 18, 1943 |
| 2,448,107 | Mattimore et al. | Aug. 31, 1948 |
| 2,629,806 | Anderson | Feb. 24, 1953 |